June 16, 1936.   A. KÉGRESSE   2,044,306

ENDLESS TRACK VEHICLE

Filed Nov. 8, 1933

INVENTOR:
Adolphe Kégresse
BY
ATTORNEY

Patented June 16, 1936

2,044,306

UNITED STATES PATENT OFFICE 2,044,306

ENDLESS TRACK VEHICLE

Adolphe Kégresse, Courbevoie, France

Application November 8, 1933, Serial No. 697,186
In France November 17, 1932

5 Claims. (Cl. 180—9.2)

It is known that in endless track vehicles, it is of importance to cause the greatest possible portion of the endless band to bear on the ground. In the known vehicles, however, the distribution of the load over the portion of the endless band in contact with the ground is effected in an invariable manner, so that during a very short turn, for example, all the portion of the endless band considered, scrapes laterally on the ground. This scraping, which is above all very considerable at the ends of the endless band, has the effect of tending to plough the ground and to impose an abnormal stress on the endless band and all the associated mechanism.

It is to be observed that, during a turn of very small radius, it is principally the endless band on the inside which is subjected to the maximum scraping stresses, while the outer band, which is the driving band and describes a circle of greater radius than the inner band, will exert on the ground a friction with a turning movement less harmful than the violent scraping of the inner band.

The present invention provides a means of obviating the foregoing disadvantage by utilizing a slight portion of the motive power of the vehicle itself in order to cause the distribution of the load on the endless band to vary according to requirements.

A variety of mechanism known in all branches of the art may be applied to the invention, and these mechanisms may be pneumatic, hydraulic, mechanical, electro-mechanical or even electrical.

A pneumatic device will be described hereinafter, and according to which any person versed in the art will be able to construct one of the known devices mentioned in the foregoing and capable of satisfying the conditions of the invention.

Figure 1:
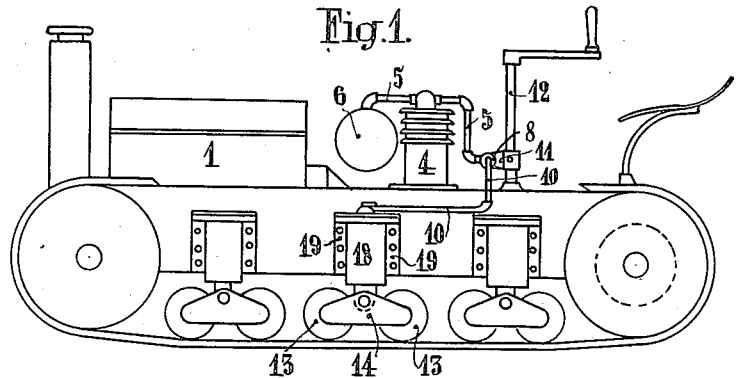
Figure 1 shows in elevation an endless track vehicle, with a device according to the invention shown diagrammatically.
Figure 2:
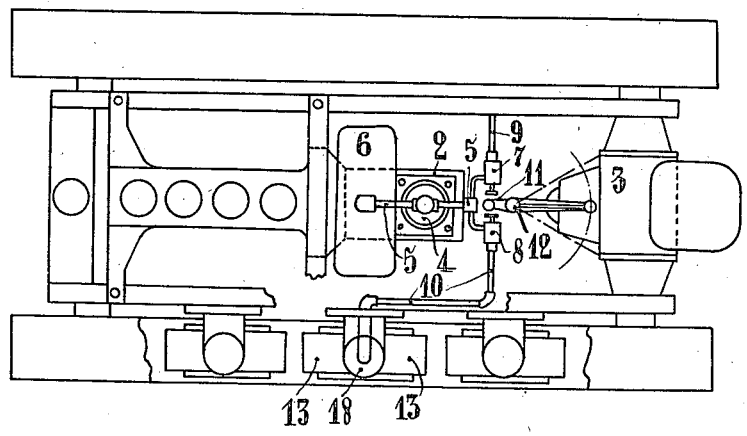
Figure 2 is a plan view of Figure 1.
Figure 3:
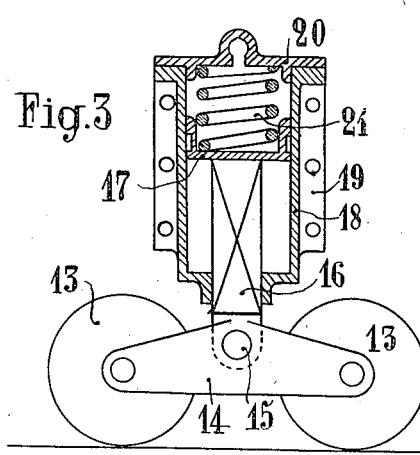
Figure 3 shows a detail of the carrying set of rollers on a larger scale and in section.

The propelling system may comprise any desired number of rollers, and in the example which will be described hereinafter, it is driven in known manner by an engine which transmits its movement to a gear box 2 and a driving axle 3.

An air compressor 4, the drive of which may be taken either from the engine or from any point of the transmission, forces compressed air by means of a pipe 5 into a reservoir 6, and two distribution valves 7 and 8 are connected to the central carrying set of rollers of the corresponding side by means of pipes 9 and 10.

The valves 7 and 8 are controlled by a small lever 11 which is mounted on the steering gear 12 of the vehicle.

The load-supporting rollers 13 comprise intermediate and end sets on each side of the vehicle, the intermediate sets of the two sides being positioned substantially on a transverse line passing through the center of gravity of the vehicle.

The rollers 13 of the carrying set are connected in pairs by an equalizer 14, the said equalizer being pivoted at 15 to the lower portion of a guide member 16 which guide member carries in its upper portion a piston or diaphragm 17. The said piston 17 is movable in a cylinder 18 which is fixed rigidly to the chassis of the vehicle by lugs 19.

A suspension spring 21 is disposed between the piston 17 and the cover of the cylinder 18.

The device operates as follows:—

When it is desired to change direction, the driver operates the steering gear 12 controlling the turning of the vehicle. The steering gear, in moving, actuates the small lever 11 which, by bearing on one of the valves 7 or 8, according as to whether the vehicle is being turned to the right or to the left, sends compressed air into the intermediate carrying set of rollers of the corresponding side.

This compressed air entering the cylinder 18 acts upon the piston 17 and consequently effects the raising of the vehicle on the corresponding side, on a single carrying set of rollers, by the amount of the stroke of the piston in the cylinder. It will be seen, therefore, that at this moment the endless track mechanism on the desired side will bear on the ground only over a very small area in the vicinity of the center of gravity of the machine. The other portions of the endless track and its supporting rollers, being raised from the ground, will no longer offer any resistance to the lateral displacement of the vehicle, which in a way can pivot on the central part of the endless band situated on the inside of the turn.

For vehicles of very large dimensions, it is of advantage to raise the ends of the two endless bands on both sides of the vehicle, instead of only on one side, as described in the foregoing. In this case, it will merely be necessary to force compressed air to the cylinders on both sides simultaneously which does not offer any difficulty, it being possible to employ a single valve for this purpose.

It will likewise be understood that the same device may be applied to sets of a larger or smaller number of rollers, and that each cylinder may act not on a pair of rollers but on a single roller or on units of three, four or more rollers without in any way departing from the scope of the invention.

It will also be appreciated that it is possible to construct a hydraulic device on the same principle. For this purpose, it is merely necessary to replace the compressed air apparatus by hydraulic apparatus using oil or any other liquid commonly employed in the art.

As stated hereinbefore, it is also possible to vary the distribution of the load by means of a mechanical device which anyone versed in the art will readily construct by deriving the motion from any part of the transmission and causing it to act, with or without reversal of direction on a lever, cam or jack device connected to the portions considered of the carrying set of rollers.

It is also possible to provide an electro-mechanical device in which an electric servo-motor controls the appropriate raising devices.

An electrical device may also be constructed by means of electro-magnets acting directly on the carrying set of rollers concerned.

All these combinations may be employed for carrying out the invention, and are, together with modifications thereof, included within the scope of the invention.

I claim:

1. In an endless track vehicle without ground wheels and having on each side spaced track-carrying wheels raised from the ground, an endless track carried by said wheels, intermediate and end load-supporting rollers positioned intermediate said wheels and bearing on the ground-engaging stretch of said track, steering mechanism, means cooperating with said intermediate load-supporting rollers on each side of the vehicle for raising the vehicle relative to said intermediate load-supporting rollers to apply substantially the entire load on said intermediate rollers, and means operable directly by the steering mechanism for selectively actuating the load-distributing means.

2. In an endless track vehicle having a chassis, a pair of spaced endless track-carrying wheels mounted on each side thereof, an endless track mounted on each side of the chassis on each pair of spaced wheels, a plurality of load-supporting rollers mounted on each side of the chassis and bearing on the ground-engaging stretches of the endless tracks, one of said rollers on each side of the vehicle being positioned approximately on a transverse line passing through the center of gravity of the vehicle, steering mechanism, means for lowering the rollers positioned at the center of gravity relative to the chassis to apply substantially the entire load on said rollers and to relieve the load on the other rollers, and means controlled by the steering mechanism for actuating said roller-lowering means.

3. In an endless track vehicle having a chassis, a pair of spaced endless track-carrying wheels mounted on each side thereof, an endless track mounted on each side of the chassis on each pair of spaced wheels, a plurality of load-supporting rollers mounted on each side of the chassis and bearing on the ground-engaging stretches of the endless tracks, one of said rollers on each side of the vehicle being positioned approximately on a transverse line passing through the center of gravity of the vehicle, steering mechanism, fluid pressure actuated means for lowering the rollers positioned at the center of gravity relative to said chassis to apply substantially the entire load on said rollers, to relieve the load on the other rollers and to effectively raise the end portions of said track from the ground, fluid pressure generating means on said chassis, and valves associated with said steering mechanism for controlling the lowering of said rollers.

4. An endless track vehicle comprising a chassis, front and rear track-carrying wheels mounted on each side of the chassis, an endless track carried by the wheels on each side of the chassis, a load-supporting roller on each side of the chassis intermediate said track-carrying wheels approximately on a transverse line passing through the center of gravity of the vehicle, each of said rollers bearing on the ground-engaging stretches of the track on the corresponding side of the chassis, and means for lowering said rollers to raise the chassis, wheels and track relative to said load-supporting rollers to shift substantially the entire weight of the vehicle to said rollers and the portions of the stretches of track between said rollers and the ground to decrease the load supported by the wheels and the remaining portions of the ground-engaging stretches of track.

5. An endless track vehicle comprising a chassis, front and rear track-carrying wheels mounted on each side of the chassis, an endless track carried by the wheels on each side of the chassis, a load-supporting roller on each side of the chassis intermediate said track-carrying wheels approximately on a transverse line passing through the center of gravity of the vehicle, each of said rollers bearing on the ground-engaging stretches of the track on the corresponding side of the chassis, means for lowering said rollers to raise the chassis, wheels and track relative to said load-supporting rollers to shift substantially the entire weight of the vehicle to said rollers and the portions of the stretches of track between said rollers and the ground to decrease the load supported by the wheels and the remaining portions of the ground-engaging stretches of track, means for steering said vehicle, and means actuated by the steering means for operating the roller lowering means in synchronism with the steering action.

ADOLPHE KÉGRESSE.